United States Patent [19]
Batz et al.

[11] Patent Number: 5,918,022
[45] Date of Patent: Jun. 29, 1999

[54] PROTOCOL FOR TRANSPORTING RESERVATION SYSTEM DATA OVER A TCP/IP NETWORK

[75] Inventors: Robert M. Batz, Raleigh, N.C.; Andrew R. Rothwell, Newport, Australia; Wilfred Wong, San Francisco, Calif.

[73] Assignee: Cisco Technology, Inc., San Jose, Calif.

[21] Appl. No.: 09/161,933

[22] Filed: Sep. 28, 1998

[51] Int. Cl.⁶ .................................................. G06F 13/38
[52] U.S. Cl. ...................................................... 395/200.66
[58] Field of Search ........................ 364/DIG. 1, DIG. 2; 395/200.3, 200.33, 200.47, 200.48, 200.49, 200.6, 200.61, 200.62, 200.66, 200.76; 705/5; 370/238

[56] References Cited

U.S. PATENT DOCUMENTS

| | | | |
|---|---|---|---|
| 5,095,480 | 3/1992 | Fenner | 370/238 |
| 5,623,605 | 4/1997 | Keshav et al. | 395/200.66 |
| 5,732,398 | 3/1998 | Tagawa | 705/5 |

OTHER PUBLICATIONS

A. Robert SITA, Mapping of Airline Reservation, Ticketing and Messaging Traffic Over IP, May 1998, 1–19.
L. Wells and A. Bartky, Data Link Switching: Switch–To–Switch Protocol AIW DLSw RIG: DLSw Closed Pages, DLSw Standard Version 1.0, Apr. 1995, pp. 1–91.

*Primary Examiner*—Robert B. Harrell
*Attorney, Agent, or Firm*—Cesari and McKenna, LLP

[57] ABSTRACT

An ALPS tunneling protocol (ATP) is used to transport airline reservation data over ATP virtual circuits extending between branch and data center resources of an air-line reservation internetwork system. The resources include branch and data center routers, along with AX.25/EMTOX virtual circuits, bordering a TCP/IP network cloud of the internetwork system. The ATP protocol includes a set of primitives used to establish ATP virtual circuits for transporting ATP-encapsulated frames between the branch and data center routers. The frames are encapsulated in accordance with an encapsulation technique of the ATP protocol that enables maintenance of airline reservation data frame boundaries over the TCP/IP network and correlation between ATP virtual circuit end-points in the routers.

20 Claims, 7 Drawing Sheets

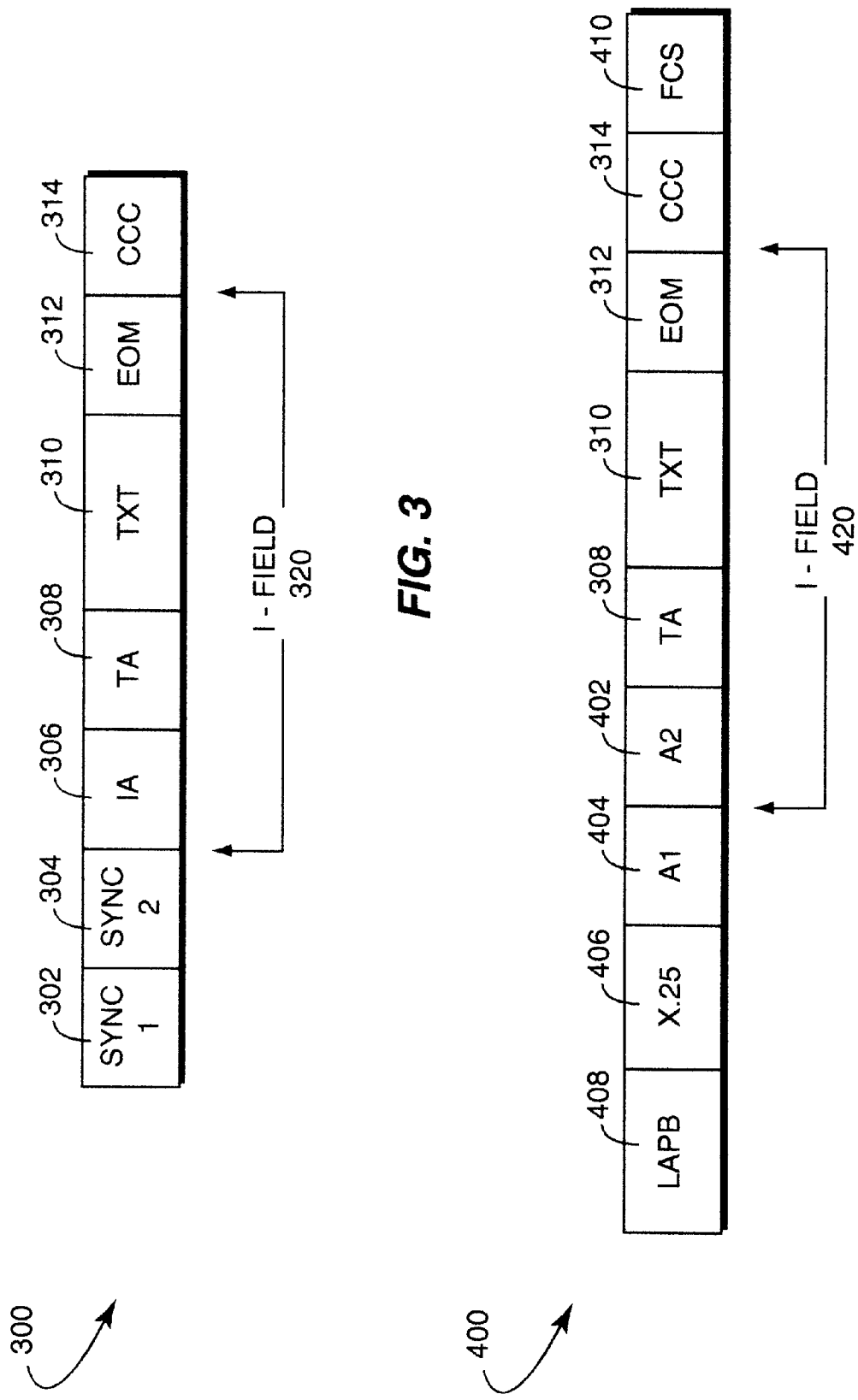

PROTOCOL FOR TRANSPORTING RESERVATION SYSTEM DATA OVER A TCP/IP NETWORK

FIELD OF THE INVENTION

This invention relates to data communication internetworks and, more specifically, to a technique for efficiently transporting reservation system data over an internetwork system.

BACKGROUND OF THE INVENTION

Data communication in a computer internetwork involves the exchange of data between two or more entities interconnected by communication links and networks. These entities are typically software programs executing on hardware computer platforms, such as end stations and intermediate stations. An example of an intermediate station may be a switch or router which interconnects the communication links and networks to enable transmission of data between the end stations.

Communication software executing on the end stations generally correlate and manage data communication with other end stations. The stations typically communicate by exchanging discrete packets or frames of data according to predefined protocols. In this context, a protocol consists of a set of rules defining how the stations interact with each other. In addition, network routing software executing on the routers allow expansion of communication to other end stations. Collectively, these hardware and software components comprise a communications network and their interconnections are defined by an underlying architecture.

Modern communications network architectures are typically organized as a series of hardware and software levels or "layers" within each station. These layers interact to format data for transfer between, e.g., a source station and a destination station communicating over the network. Predetermined services are performed on the data as it passes through each layer and the layers communicate with each other by means of the predefined protocols. An example of such a communications architecture is the Internet communications architecture.

The Internet architecture is represented by four layers which are termed, in ascending interfacing order, the network interface, internetwork, transport and application layers. These layers are arranged to form a protocol stack in each communicating station of the network. FIG. 1 illustrates a schematic block diagram of prior art Internet protocol stacks 125 and 175 used to transmit data between a source station 110 and a destination station 150, respectively, of a network 100. As can be seen, the stacks 125 and 175 are physically connected through a communications channel 180 at the network interface layers 120 and 160. For ease of description, the protocol stack 125 will be described.

In general, the lower layers of the communications stack provide internetworking services and the upper layers, which are the users of these services, collectively provide common network application services. The application layer 112 provides services suitable for the different types of applications using the network, while the lower network is interface layer 120 utilizes industry standards defining a flexible network architecture oriented to the implementation of local area networks (LANs) and wide area networks (WANs).

Specifically, the network interface layer 120 comprises physical and data link sublayers. The physical layer 126 is concerned with the actual transmission of signals across the communication channel and defines the types of cabling, plugs and connectors used in connection with the channel. The data link layer (i.e., "layer 2") is responsible for transmission of data from one station to another and may be further divided into two sublayers: Logical Link Control (LLC 122) and Media Access Control (MAC 124). The LLC sublayer 122 is responsible for providing connectionless or connection-oriented communication services, while the MAC sublayer 124 is responsible for layer 2 addressing and controlling access to the transmission medium.

The transport layer 114 and the internetwork layer 116 are substantially involved in providing predefined sets of services to aid in connecting the source station to the destination station when establishing application-to-application communication sessions. The primary network layer protocol of the Internet architecture is the Internet protocol (IP) contained within the internetwork layer 116. IP is primarily a connectionless network protocol that provides internetwork routing, fragmentation and reassembly of datagrams and that relies on transport protocols for end-to-end reliability. An example of such a transport protocol is the Transmission Control Protocol (TCP) contained within the transport layer 114. Notably, TCP provides connection-oriented services to the upper layer protocols of the Internet architecture. The term TCP/IP is commonly used to refer to the Internet architecture which is further described in *Computer Networks* by Andrew S. Tanenbaum, printed by Prentice Hall PTR, Upper Saddle River, N.J., 1996.

Data transmission over the network 100 therefore consists of generating data in, e.g., sending process 104 executing on the source station 110, passing that data to the application layer 112 and down through the layers of the protocol stack 125, where the data are sequentially formatted as a frame for delivery onto the channel 180 as bits. Those frame bits are then transmitted over an established connection of channel 180 to the protocol stack 175 of the destination station 150 where they are passed up that stack to a receiving process 174. Data flow is schematically illustrated by solid arrows.

Although actual data transmission occurs vertically through the stacks, each layer is programmed as though such transmission were horizontal. That is, each layer in the source station 110 is programmed to transmit data to its corresponding layer in the destination station 150, as schematically shown by dotted arrows. To achieve this effect, each layer of the protocol stack 125 in the source station 110 typically adds information (in the form of a header) to the data generated by the sending process as the data descends the stack.

For example, the internetwork layer encapsulates data presented to it by the transport layer within a packet having an internetwork layer header. The internetwork layer header contains, among other information, source and destination (logical) network addresses needed to complete the data transfer. The data link layer, in turn, encapsulates the packet in a frame that includes a data link layer header containing information required to complete the data link functions, such as (physical) MAC addresses. At the destination station 150, these encapsulated headers are stripped off one-by-one as the frame propagates up the layers of the stack 175 until it arrives at the receiving process.

FIG. 2 is a schematic diagram of a conventional airline reservation system 200 that comprises a plurality of components including a host reservation system (HRS) 250. Users, such as reservation agents, access the HRS through display terminals 202 and printer terminals 204 connected to an agent set control unit (ASCU 210). The ASCU 210 is coupled to a network cloud 220 via a branch network interface system (NIS) 214; the ASCU functions as a communications controller between the network and terminals. A gateway 206 may be present downstream of the NIS 214 to provide high-level protocol conversion (i.e., higher than layer 2). The gateway 206 interfaces to a local area network (such as a token ring 208) having devices 205 coupled thereto; this arrangement enables a TCP/IP session between the gateway and a device as typically occurs in an airport where the gateway functions as an airport services gateway.

Communication between the branch NIS 214 and ASCU 210 or gateway 206 involves the exchange of data frames using character-oriented protocols, such as the IBM airline control (ALC) protocol or the Unisys terminal system (UTS) protocol. The ALC protocol (such as P1024B) is typically used to communicate with an IBM mainframe computer functioning as the HRS 250, whereas the UTS protocol (such as P1024C) is generally used to communicate with a Unisys computer system functioning as the HRS. The P1024 terminology originates from the Societe International de Telecommunications Aeronautiques (SITA) which is an international company (e.g., a service provider) for the airline reservation systems that provides, inter alia, the NISs 214. For ease of description, the ALC protocol will be used hereinafter as an example of the character-oriented protocol.

The branch NIS 214 receives the ALC frames and locally terminates the protocol by encapsulating the frames for transmission over the network 220 to a data center NIS 224. The data center NIS then forwards the data message from the network 220 to the HRS 250 over a communication link employing virtual circuits associated with, e.g., an Airline X.25 (AX.25) protocol or an Exchange of Mixed Traffic over X.25 (EMTOX) protocol. An example of an HRS 250 is an IBM mainframe computer executing a Transaction Processing Facility (TPF) operating system in support of various reservation application programs executing on the mainframe. The TPF mainframe is typically channelattached to an IBM 3745 (or 3725) front end processor (FEP) running an NCP application program. The HRS 250 creates a response to the data message and sends that response to the data center NIS over either an AX.25 or EMTOX virtual circuit. The data center NIS forwards the message over the network cloud 220 to the appropriate branch NIS 214 which, in turn, forwards this message to the appropriate ASCU 210 for output on the display terminal 202 or printer terminal 204.

A problem with the conventional reservation system network involves correlation between ASCUs and AX.25/ EMTOX virtual circuits when transporting data messages over the network 220 between the terminals and the HRS. When the branch NIS 214 receives a message from an ASCU 210 and forwards the data over the network 220, the data center NIS 224 must be able to select the correct AX.25 or EMTOX virtual circuit for forwarding the data to the HRS. Similarly when the HRS 250 sends a message to a user, the data center NIS must forward the message to the correct branch NIS which, in turn, must forward the message to the correct ASCU.

This problem is currently solved by using X.25 as the backbone networking protocol between the branch NIS 214 and the data center NIS 224. The X.25 protocol is a conventional layer 3, connection-oriented protocol that employs virtual circuits. Data messages are transported between the HRS and the terminals over these X.25 virtual circuits, which are typically Switched Virtual Circuits (SVCs). Connection establishment of an X.25 SVC comprises the exchange of conventional X.25 Call and Call Confirm messages/packets. An SVC can be established and brought down dynamically within the context of an X.25 network and its data terminal equipment, such as the branch and data center NISs. A logical channel number (LCN) is assigned by the initiator (e.g., a branch NIS) of the SVC connection in the X.25 network and is used by the data center NIS to correlate the X.25 SVC with an appropriate EMTOX or AX.25 virtual circuit. The details of X.25 virtual circuit connection establishment and termination are well-known and, thus, will not be described herein.

The AX.25 protocol is generally the same as the X.25 protocol with the exception that it employs a non-standard packet size of 240 bytes rather than conventional X.25 packet sizes of 128 bytes, 256 bytes or 512 bytes and that it utilizes permanent virtual circuits (PVCs) rather the SVCS. A PVC generally requires no Call set-up procedures for the connection between data center NIS and the HRS because that connection is technically "never" destroyed. EMTOX, on the other hand, is a specification for transmitting airline protocol data over standard X.25 SVCs.

The branch NIS may further associate a single SVC with each ASCU or with a group of ASCUs using ASCU identifiers that are passed within user data fields of Call and Call Confirm packets when establishing the X.25 SVC. The ASCU identifier identifies each ASCU to the HRS by two 1-byte values A1 and A2. Collectively, A1 and A2 provide a 2-byte representation ($2^{16}$) of ASCUs to the host; however, the ASCUs recognize themselves via a 1-byte interchange address (IA) value. The 2-byte A1/A2 value is prepended to each data message to identify the ASCU associated with the message.

In such an X.25 network environment, the branch NIS 214 may be a terminal protocol assembler-disassembler (TPAD) device that functions as a protocol converter to transfer ALC data messages over the network. Thus, the messages are converted by TPAD into an X.25 format and transported over one or more SVCs through the X.25 network cloud and onto the data center NIS 124, which may be a host protocol assembler-disassembler (HPAD) device. The TPAD device may establish an X.25 SVC directly with the FEP of the TPF system using the EMTOX protocol, i.e., without the assistance of the HPAD device. X.25 traffic support within the NCP program is provided via an NCP packet switching interface (NPSI) software program. However, the HPAD is needed to interface an X.25 SVC to an AX.25 link because the AX.25 protocol is non-standard and utilizes PVCs. The AX.25 PVC connection has an assumed LCN that the HPAD uses to associate the connection with an appropriate X.25 SVC.

FIG. 3 is a schematic block diagram of a data frame 300 having a format defined by the ALC protocol. The ALC frame format comprises a first 1-byte synchronization (SYNC 1) field 302, a second 1-byte synchronization (SYNC 2) field 304, a 1-byte interchange address (IA) field 306, a 1-byte terminal address (TA) field 308, an n-byte text (TXT) field 310 containing user data, a 1-byte end-of-message (EOM) field 312 and a 1-byte Cyclical Check Character (CCC) field 314 that is used to perform error checking on the frame. Note that the fields 306–312 comprise an I-field 320.

A terminal 202 sends a text data message to ASCU 210 which generates the ALC data frame 300 and transmits it to TPAD 214. TPAD processes the frame to create a conventional frame format 400, shown in FIG. 4, for transmission over the X.25 network. TPAD 214 parses the frame 300 to remove the SYNC bytes 302, 304 and replaces the contents of the IA field 306 with the A2 value in field 402 of the ASCU identifier; the A1 is value is then prepended to the parsed frame as an ASCU identification header 404. The TPAD device is pre-configured with translation information used to perform a mapping operation between the IA field contents and the A1/A2 values inserted into the parsed frame.

TPAD then prepends an X.25 protocol field 406 along with a Link Access Protocol B (LAPB) field 408, whose content describes a data link control (DLC) protocol that provides a reliable connection between TPAD and a switch of the X.25 network. A Frame Check Sequence (FCS) field 410 is also appended to the LAPB frame 400 to ensure the accuracy of the information contained within the frame. The FCS field is a 2-byte field that may encapsulate, inter alia, the CCC field 314, although in some embodiments the CCC field may be removed. LAPB encapsulation provides separate LAPB sessions between X.25 switches. The DLC protocol thereafter enables multiplexing of a plurality of X.25 virtual circuits over a single LAPB session. However, this encapsulation technique is generally restricted to operations over an X.25 network.

The LAPB frame 400 is forwarded over an X.25 SVC from the TPAD to HPAD, which forwards it over an appropriate AX.25 or EMTOX virtual circuit specified by a configured or "learned" LCN correlator. The LAPB frame format 400 remains generally in tact for the EMTOX protocol embodiment, but for the AX.25 protocol embodiment, the HPAD effectively reconfigures the segment size of the data transferred over the link to the HRS. For example, a 500-byte frame, representing the I-field 420 of the LAPB frame, is segmented into four 128-byte frames for transmission over the X.25 network. Upon receiving the four frames, HPAD combines them into three 240-byte frames for transmission over the AX.25 link.

In either embodiment, the ASCU identifiers are maintained so the HRS can determine the ASCU from which the message originated. When the HRS sends a response to the user, it also prepends the ASCU identifier to the message. Based on the AX.25 or EMTOX virtual circuit LCN (and possibly the ASCU identifier), the HPAD forwards the message over an X.25 SVC to the TPAD, which inspects the ASCU identifiers to determine the correct ASCU to receive the message.

Although the current solution works well for X.25 networks, it does not generally work for other WAN backbone protocols such as Frame Relay or ATM unless the X.25 SVC is "tunneled" over that backbone protocol. Service providers for airline reservation systems generally prefer interoperating with a common IP backbone over Frame Relay, ATM or X.25 so that other revenue-generating network services may be offered. Frame Relay is a layer 2 protocol that generally "switches" frames across the network in a connection-oriented manner; although there are some SVC implementations of Frame Relay, that protocol is primarily PVC-oriented. For example, when a branch NIS communicates with a data center NIS over a Frame Relay network, the Frame Relay network administrator is notified and a PVC is established between the two entities. In addition, customers generally prefer utilizing an IP backbone to the HRS.

RFC 2351 describes Mapping of Airline Traffic over IP (MATIP) which is a system for transporting reservation system data over a TCP session on a TCP/IP network. Any WAN media over which the IP protocol can be transported (such as Frame Relay or ATM, instead of just X.25) can be used by MATIP. However, the TCP session endpoints in such an environment reside within the branch NIS and the HRS. A typical HRS system does not generally have a TCP/IP protocol stack, thereby requiring use of a different processor in the HRS. In addition, although MATIP is layered over TCP/IP, it does not support multiplexing of multiple MATIP circuits over a TCP session and, as a result, requires a one-to-one correlation between a MATIP virtual circuit and a TCP session.

Therefore, an object of the present invention is to provide a system for transporting airline reservation data over a TCP/IP network.

Another object of the present invention is to provide an encapsulation technique for data messages that provides correlation between ASCUs and AX.25/EMTOX virtual circuits bordering a TCP/IP network.

Another object of the present invention is to provide a technique for limiting the number of TCP sessions used to transport airline reservation data over a TCP/IP network to thereby reduce overhead and consumption of resources in the network.

SUMMARY OF THE INVENTION

The invention comprises a novel tunneling protocol used to transport airline reservation data over virtual circuits extending between branch and data center resources of an airline reservation internetwork system. The resources include branch and data center routers, along with AX.25/EMTOX virtual circuits, bordering a TCP/IP network cloud of the internetwork system. The tunneling protocol is an airline protocol support (ALPS) tunneling protocol (ATP) that includes a set of primitives used to establish ATP virtual circuits for transporting ATP-encapsulated frames between the branch and data center routers. The frames are encapsulated in accordance with an encapsulation technique of the ATP protocol that enables (a) maintenance of airline reservation data frame boundaries over the TCP/IP network, and (b) correlation between ATP virtual circuit endpoints in the routers.

Specifically, the ATP protocol provides a routing/transport mechanism for "tunneling" ATP frame traffic over the ATP virtual circuits between the router endpoints and through the TCP/IP network. In the illustrative embodiment, Open_Request and Open_Confirm message primitives are exchanged among the branch and data center routers to activate the ATP virtual circuits. The messages preferably include vectors for passing configuration information used by the endpoints of the circuits. For example, a user data vector passes ASCU multiplexing and encapsulation information that includes a list of ASCU identifiers, whereas an AX.25/EMTOX configuration vector passes AX.25 and EMTOX configuration information that is used by the ATP endpoints to correlate ASCU and AX.25/EMTOX resources.

In accordance with the invention, each encapsulated frame comprises a novel ATP header having a length field whose contents specify the length of the data frame; this length information is also used to faciliate maintenance of frame boundaries. The ATP header fuirther comprises a pair of source and destination correlators that are used by the branch and data center routers to efficiently identify those ATP virtual circuits associated with the ATP-encapsulated frames. According to an aspect of the invention, multiple ATP virtual circuits may be multiplexed across a single TCP session using these correlators to associate the virtual circuits with appropriate AX.25/EMTOX virtual circuits.

BRIEF DESCRIPTION OF THE DRAWINGS

The above and further advantages of the invention may be better understood by referring to the following description in conjunction with the accompanying drawings in which like reference numbers indicate identical or functionally similar elements:

FIG. 3 is a schematic block diagram of a conventional data frame that may be used in the airline reservation system of FIG. 2;

FIG. 4 is a schematic block diagram of another conventional frame format that may be used in the airline reservation system having an X.25 network;

DETAILED DESCRIPTION OF AN ILLUSTRATIVE EMBODIMENT

Figure 1:
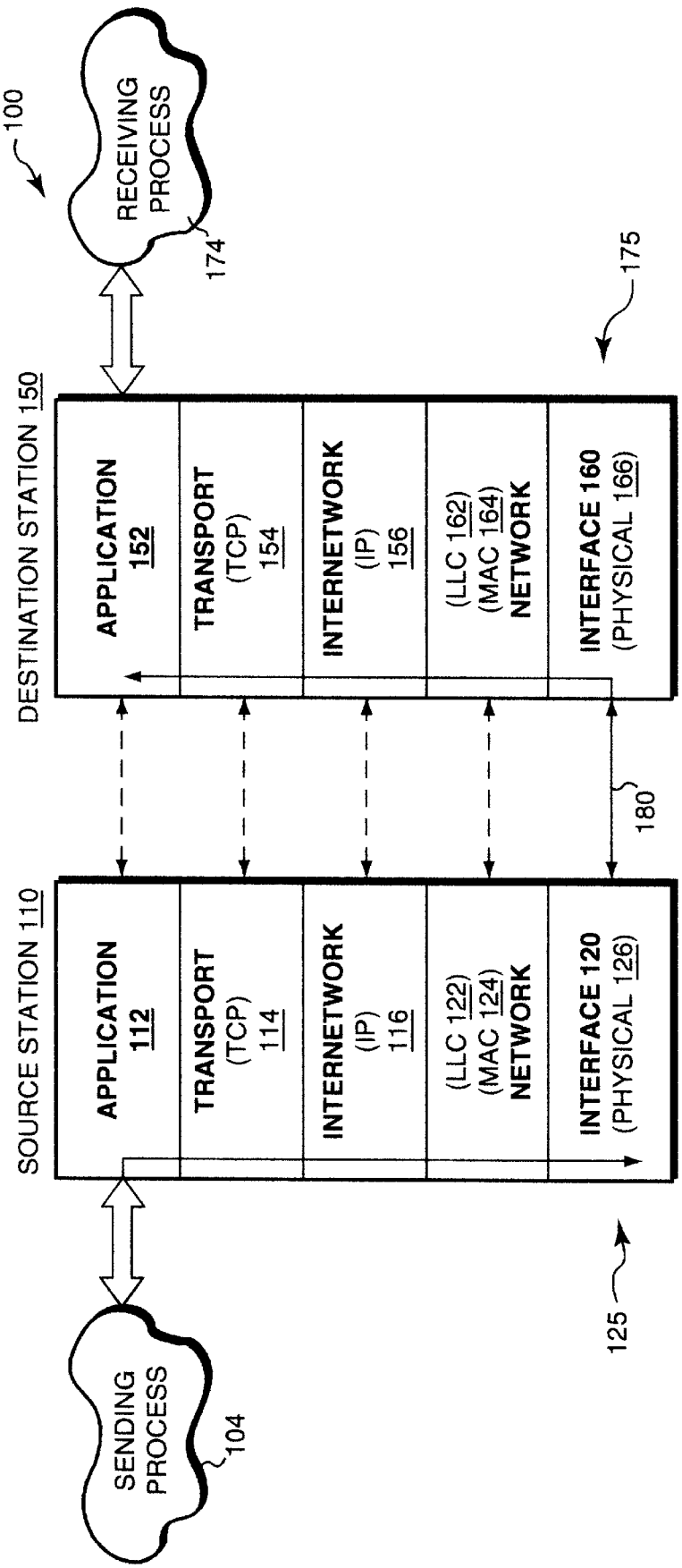
FIG. 1 is a schematic block diagram of conventional TCP/IP communications architecture protocol stacks used to transmit data between stations of a computer network.
Figure 2:
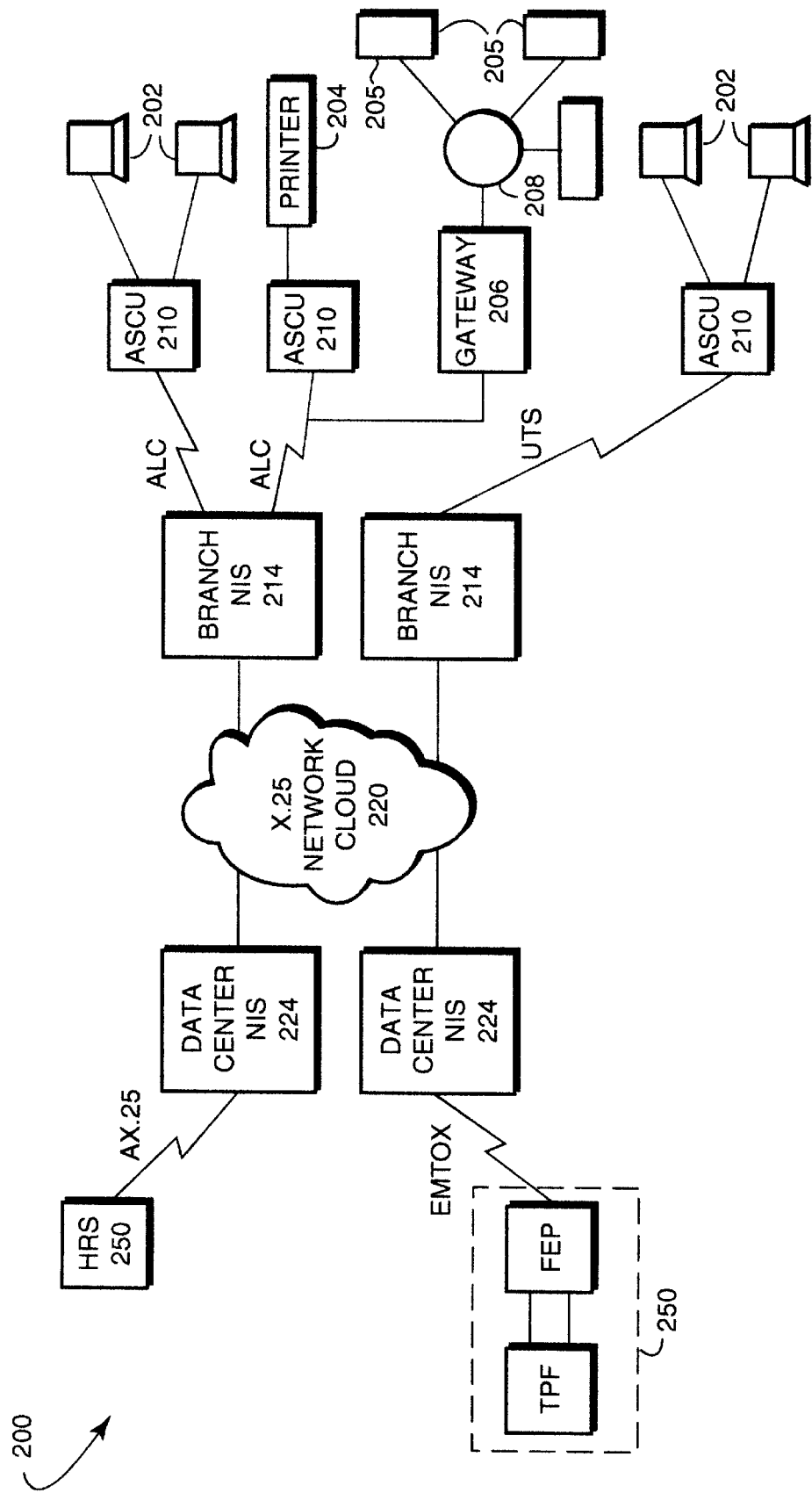
FIG. 2 is a schematic diagram of a conventional airline reservation system.
Figure 5:
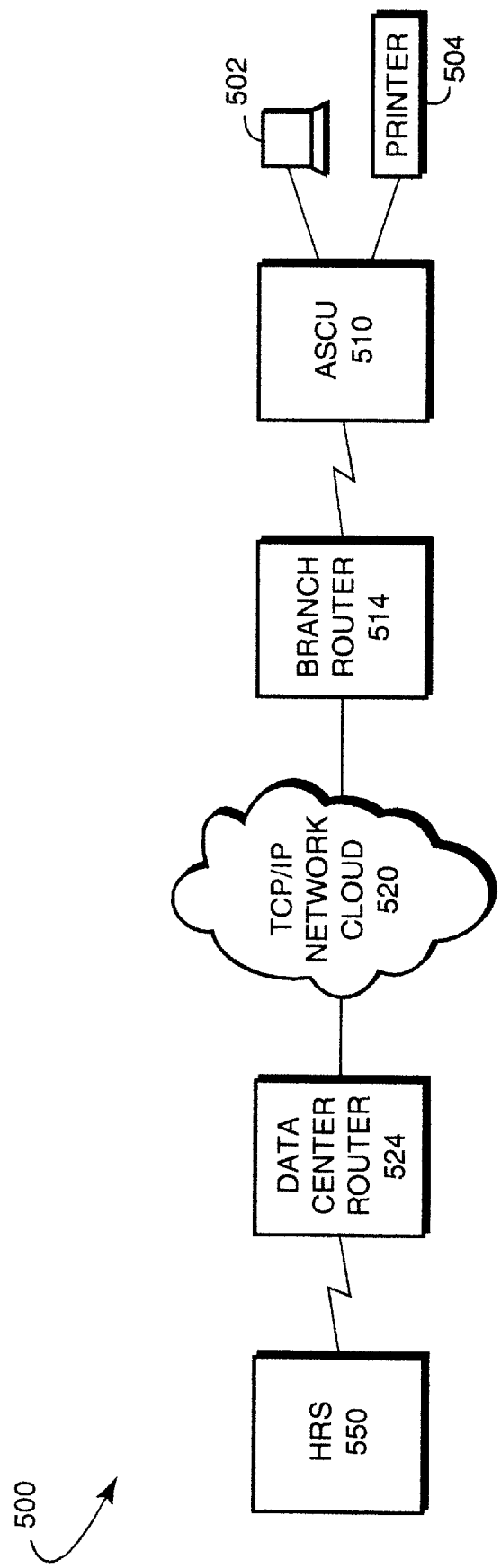
FIG. 5 is a schematic diagram of an illustrative internetwork that may be advantageously used with an ATP protocol of the present invention.

FIG. 5 is a schematic diagram of an illustrative internetwork 500 that may be advantageously used as a reservation system network with the present invention. The internetwork comprises a data center router 524 coupled between a HRS system 550 and a TCP/IP network cloud 520. In addition, a branch router 514 is coupled between the TCP/IP network 520 and an ASCU 510. Communication between the ASCU and branch router 514 preferably comprises the exchange of frames defined by the ALC protocol, whereas communication between the HRS system 550 and router 524 comprises the exchange of frames in accordance with the EMTOX and/or AX.25 protocols.

The data center and branch routers are preferably routers manufactured by Cisco Systems, Inc. of San Jose, Calif. Each router typically comprises a plurality of interconnected elements, such as a processor, a memory and a network port adapter. The memory may comprise storage locations addressable by the processor and adapter for storing software programs and data structures associated with the inventive ATP protocol described herein. The processor may comprise processing elements or logic for executing the software programs and manipulating the data structures.

An operating system, portions of which are typically resident in memory and executed by the processor, functionally organizes the router by, inter alia, invoking network operations in support of software processes executing on the router. In the illustrative embodiment, the operating system is an Internetwork Operating System (IOS) and the application software includes an airline protocol support (ALPS) program, both of which are available from Cisco Systems, Inc. It will be apparent to those skilled in the art that other processor and memory means, including various computer readable media, may be used for storing and executing program instructions pertaining to the techniques described herein.

Figure 6:
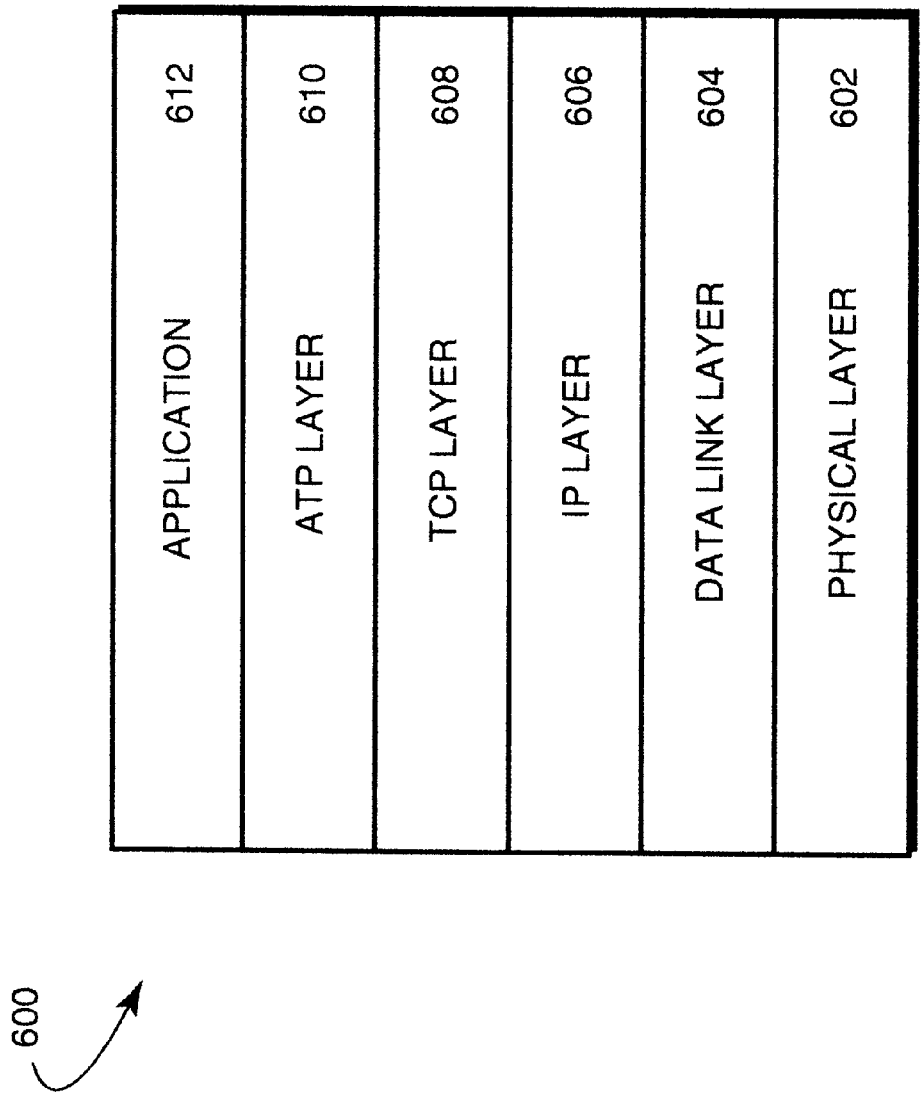
FIG. 6 is a schematic diagram of a TCP/IP protocol stack that is modified to include an ATP protocol layer in accordance with the invention.

The TCP/IP network 520 replaces the X.25 network cloud 320 of the conventional airline reservation system 200 so that, instead of using conventional X.25 switched virtual circuits (SVCs), the invention provides ATP virtual circuits that run over the TCP/IP network. These virtual circuits are created by the ALPS process executing on the routers to encapsulate ("tunnel") data frames for transmission over a conventional TCP/IP virtual circuit connection in accordance with the ATP protocol. FIG. 6 is a schematic diagram of a TCP/IP protocol stack 600 that is modified to include an ATP protocol layer 610. The ATP software is preferably layered between the TCP layer 608 (used to establish conventional connection-oriented TCP communication sessions) and the application layer 612, and uses a conventional application programming interface for communication into the TCP layer. The branch and data center routers 514, 524 are configured with the modified protocol stack 600 to enable interpretation and manipulation of the ATP frame formats according to the novel tunneling protocol.

As noted, virtual circuits are correlated by logical channel numbers (LCNs) in an X.25 network. In accordance with the invention, however, the ATP protocol provides correlation between the branch virtual circuit resources and the data center resources. That is, the ATP protocol provides a correlation between an AX.25 permanent virtual circuit (PVC) or EMTOX SVC and an ATP virtual circuit that allows efficient identification of corresponding connections for passing data through the network. The ATP protocol includes a set of primitives used to establish ATP virtual circuits for transporting ATP-encapsulated frames between the branch and data center routers. The frames are encapsulated in accordance with an encapsulation technique of the ATP protocol that enables (a) maintenance of airline reservation data frame boundaries over the TCP/IP network, and (b) correlation between ATP virtual circuit endpoints in the routers.

Figure 7:
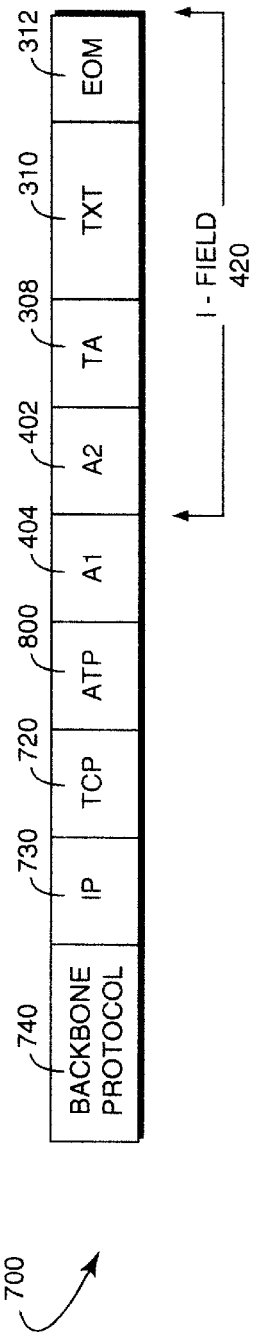
FIG. 7 is a schematic block diagram of an encapsulation format for the novel ATP protocol in accordance with the invention.

FIG. 7 is a schematic block diagram of an encapsulation format 700 for the novel ATP protocol. The ATP frame format 700 comprises an I-field 420 (FIG. 4) that includes an A2 field 402, a TA field 308, a Text field 310, and an End-of-Message (EOM) field 312. An ASCU identification header comprising an A1 field 404 is prepended to the I-field 420. In accordance with the invention, a novel ATP header 800 is also provided within the frame format 700. Prepended to the ATP header are a conventional TCP header 720, a conventional IP header 730 and a backbone protocol header 740. The header 740 may contain any backbone protocol that supports TCP/IP, including Frame Relay (FR), X.25, HDLC or ATM (i.e., any wide area network WAN). The backbone network may also be a local area network (LAN) such as Ethernet; in that case, the header 740 would contain a medium access control (MAC) address frame.

Figure 8:
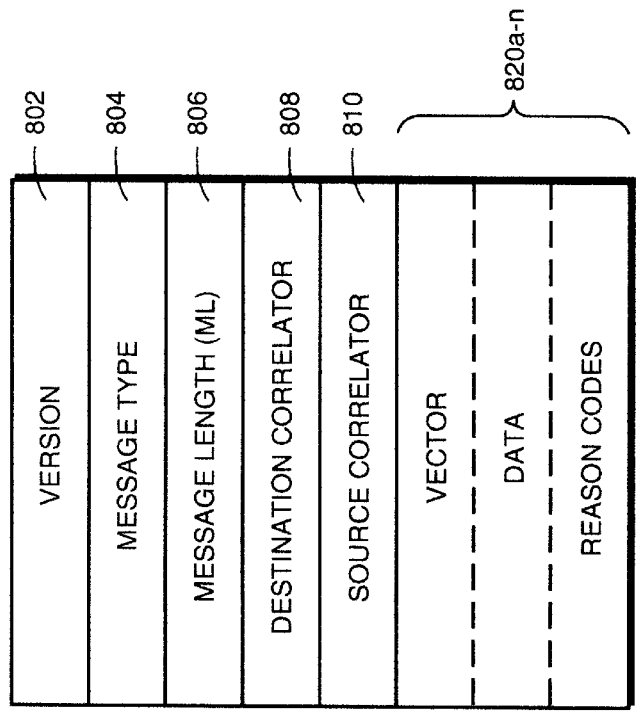
FIG. 8 is a schematic diagram of an ATP header in accordance with the invention.

FIG. 8 is a schematic diagram of the ATP header 800 which includes a plurality of fields starting at bytes 00 and extending to a message length (ML) of ML-1 bytes.

| Bytes | Frame Field |
| --- | --- |
| 00 | ATP Version Number |
| 01 | ATP Message Type |

-continued

| Bytes | Frame Field |
|---|---|
| 02–03 | ATP Message Length |
| 04–07 | ATP Destination Correlator |
| 08–11 | ATP Source Correlator. |
| 12–n | ATP Data, Reason codes, Vectors |

Broadly stated, the header 800 includes a 1-byte version number field 802 that specifies the version of the ATP protocol within the data frame and a 1-byte message type field 804 that specifies the type of primitive exchanged. A 2-byte ML field 806 specifies the length of the message including any encapsulated data, such as text data provided by an ASCII terminal or printer and forwarded across the network. A 4-byte destination correlator field 808 and a 4-byte source correlator field 810 provide "handles" (e.g., identifiers) to quickly correlate virtual circuits within the network. Fields 820a–n contain primitives that may include data through the use of variable-length vectors having a type and length. The vectors can be grouped in any desired manner to allow flexible use of the to protocol headers.

In one aspect of the invention, the ATP protocol provides an encapsulation arrangement that preserves and maintains frame boundaries. Although the ALC frame includes an EOM indicator, the TCP protocol is byte-oriented in that it transports data as a stream of bytes; thus, there is generally no means of identifying a message boundary. The contents of the the ML field 806 specifies the length of the I-field and the ASCU identification header, (i.e., the A1 field), along with the size of the ATP header. Programmed with such length information, the routers may easily discern the boundaries of the messages. For example, a 500-byte packet received at branch router 514 from an ASCU 510 has a frame length of 500 bytes plus the lengths of the ASCU identification (A1) header and the ATP header.

Moreover, the problem of correlation between virtual circuit resources at the branch and data center routers is solved through the use of source and destination correlators contained in fields 808 and 810 of the ATP header. The destination correlator is a 4-byte "cookie" used by the routers to efficiently find a connection control block data structure corresponding to an ATP virtual circuit when receiving an ATP frame. The source correlator is also a 4-byte cookie that corresponds to a connection handle of the agent transmitting the ATP frame. The receiving router stores ("caches") this latter correlator value for use as a destination correlator in ATP frames sent over the ATP circuit.

In general, the establishment and destruction of an ATP virtual circuit is tightly-coupled with the establishment and destruction of an AX.25 or EMTOX circuit, since each ATP circuit is associated with a corresponding AX.25 PVC or EMTOX SVC. ATP circuit establishment and destruction generally comprises an exchange of a set of novel ATP primitives, including (1) Open_Request which is sent to initiate establishment of an ATP circuit; (2) Open_Confirm which is sent to confirm the establishment of an ATP circuit; (3) Open_Failure which is sent to notify the sender of an Open_Request of a failure to establish an ATP circuit; (4) Data which is used to forward data over an ATP circuit; (5) Enter_Busy which provides notification of congestion at an endpoint of an ATP circuit; (6) Exit_Busy which provides notification of clearing of a congestion situation at the endpoint of an ATP circuit; and (7) Ckt_Closed which provides notification that the ATP circuit identified by the pair of correlators is closed and which is used to terminate a virtual circuit (see pg 85). The Open_Failure and Ckt_Closed primitives use diagnostic codes that specify a reason for sending the primitives. In addition to network management purposes, the reason codes may be used to determine, e.g., if a connection to an alternate data center router should be established.

Vectors are used to pass configuration information, e.g., in the Open_Request and Open_Confirm messages. A vector consists of a vector type, a vector length and a block of information. Vectors defined by the ATP protocol include: (a) a User Data vector for passing ASCU multiplexing and encapsulation information including the list of ASCU identifiers used by the ATP VC; (b) AX.25/EMTOX configuration vectors for passing AX.25 and EMTOX configuration information between the ATP endpoints; and (c) an ATP name vector for passing an ASCII name associated with each ATP circuit. The ATP name vector may appear in an Open_Request or an Open_Confirm primitive during ATP circuit establishment to assist users in management of the circuits. During the data transfer phase, the name is not passed in an ATP data message because the correlators are used to identify the circuit.

Figure 9:
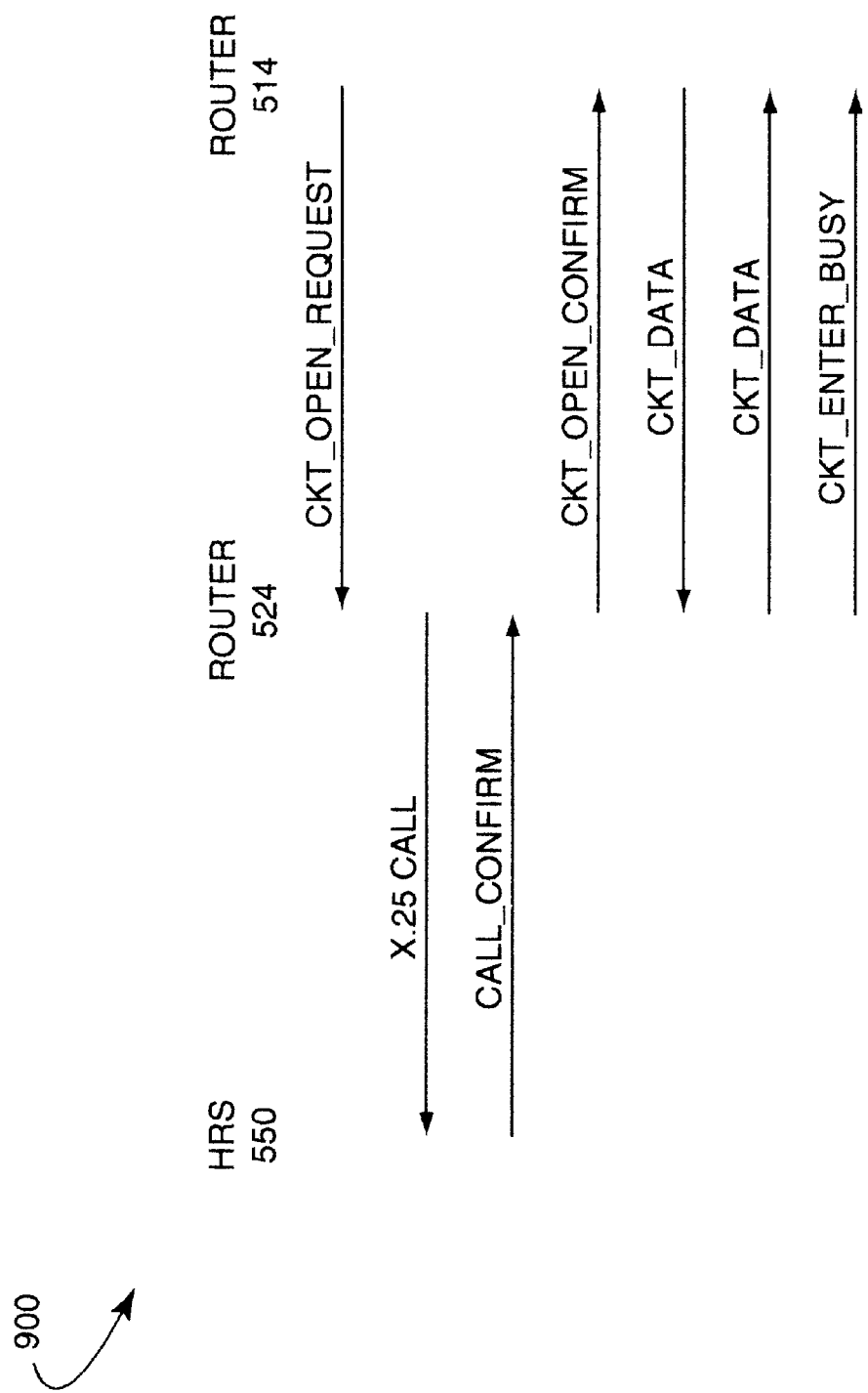
FIG. 9 is a schematic diagram of an illustrative primitive exchange sequence to establish an ALPS virtual circuit over a TCIP/IP network in accordance with the invention.

FIG. 9 is a schematic diagram of an illustrative primitive exchange sequence 900 between routers 514, 524 to establish an ATP virtual circuit over the TCP/IP network 520. In the illustrative embodiment, the ATP circuit interfaces with an AX.25 PVC or an EMTOX X.25 SVC. Establishment of the ATP circuit may occur as soon as the ATP circuit is configured, or it may be delayed until a data message is received from an ASCU using the ATP circuit. In either case, the router 514 establishes an ATP circuit by issuing an Open_Request primitive (Ckt_Open_Request), including a set of vectors with configuration information, over the TCP/IP network to the data center router 524.

If an EMTOX link is coupled to the HRS system 550, the data center router 524 sends an X.25 Call packet over the EMTOX link to the HRS 550, which responds with a Call Confirm to the router 524 if the call is accepted. Thereafter, the router 524 returns a Open_Confirm primitve (Ckt_Open_Confirm) to the branch router 514. In addition to establishing a SVC, the Call and Call Confirm packets include a user data section containing information (similar to the ATP user data vector) that specifies the connecting ASCUs. That is, the A1 and A2 values specify the ASCUs along with the appearance of the text format (ALC/UTS). Thus, there is an X.25 SVC established over the EMTOX link and an ATP VC established over the TCP/IP network.

Note that if the protocol running over the link between the router 524 and the HRS 550 is AX.25 instead of EMTOX, the exchange is modified to include transmission of (i) a reset (Reset) packet for a particular LCN from the router 524 to the HRS and (ii) a reset confirm (Reset_Cfm) for that LCN from the HRS to the data center router. This modified exchange effectively merges an existing PVC associated with the LCN into the message path. Thereafter, the routers exchange Data primitives (Ckt_Data packets) containing A1/A2 values and the TA value.

If the router 524 experiences some congestion, i.e., the router is unable to transmit over the AX.25 virtual circuit and begins "queuing" too many packets, that router sends an Enter_Busy primitive (Ckt_Enter_Busy) to the branch router 514 to invoke some type of congestion control. The congestion may be manifested by the HRS (FEP) failing to acknowledge frames and slide the "window" and, rather, forwarding Receiver Not-Ready (RNR) frames; alternatively, the FEP may fail to send receiver ready (RR)

frames which prevents the router 524 from sliding its window and sending more data. Because the data center router's queue "backs up", it exercises congestion control by instructing the branch router 514 not to send any more data until it is able to store the data. Notably, the conventional TCP flow control mechanism is not used over the TCP/IP network because the invention allows multiplexing of multiple ATP virtual circuits over a single TCP session.

According to another aspect of the invention, the source and destination correlators of the ATP header enable multiplexing of multiple ATP circuits over a TCP session. The TCP session end points are located at the branch and data center routers; once the frame has "tunneled" through the TCP network, the frame processed by these end points includes just the ATP header and data (that is, the TCP and IP headers have been stripped off the frame.). The ATP correlators are used to associate the actual ATP virtual circuits with appropriate AX.25/EMTOX virtual circuits used to transport data between the host mainframe and/or terminals. Prior to transmitting the ATP frame over the AX.25/EMTOX link, the ATP header is stripped off at the data center router 524 and an appropriate frame is encapsulated around the "data".

Operationally, when the data center router 524 receives a Ckt_Open_Request from a branch router 514, the router 524 initiates an X.25 Call exchange to build a virtual circuit over an EMTOX link. When the Call Confirm returns from the HRS 550, an X.25 SVC is established over that link. The data center router then returns a Ckt_Open_Confirm to the router 514 thereby confirming establishment of a complete path, including a one-to-one correlation between each X.25 SVC and each ATP virtual circuit, over the network to the host mainframe. The routers then commence exchanging Ckt_Data messages, each of which includes a correlator that identifies an ATP circuit. The data center router 524 parses the ATP header from the frame and encapsulates the remaining data within an X.25 frame prior to forwarding the encapsulated frame over the X.25 SVC to the HRS 550.

Advantageously, the correlators are used by the routers to facilitate determination of the appropriate ATP virtual circuit and X.25 SVC needed to transport the data over a TCP/IP network cloud between the terminals and host mainframe of the HRS system. Since configuration information can be passed among the routers within a vector at ATP circuit establishment, the configuration of, e.g., the data center router can be substantially reduced, while the addition of branch routers generally do not require AX.25 or EMTOX configuration changes. In addition, extensions to the ATP protocol may be introduced by adding new vectors to the vectors used for passing information at circuit establishment. ATP circuit management and problem diagnosis may further be simplified by passing names and diagnostic codes among the routers. As noted, congestion at one end of an ATP circuit may be passed to the other end of the ATP circuit to minimize data loss and reduce consumption of bandwidth.

Since ATP protocol uses TCP/IP as a network transport, the internetwork 500 may include an integrated IP backbone network over which reservation system service providers may provide services to their customers. Any WAN media over which the IP protocol can be transported (such as Frame Relay or ATM, instead of just X.25) can be used by the service providers. As noted, MATIP also describes a system for transporting reservation system data over a TCP/IP network employing any WAN media over which IP can be transported, similar to the invention described herein. Unlike the ATP virtual circuits of the inventive protocol which have circuit endpoints within the branch and data center routers, the TCP session endpoints in a MATIP environment reside within the branch router and the HRS.

Although MATIP is also layered over TCP/IP, it does not support multiplexing of multiple virtual circuits over a TCP session and, as a result, requires a one-to-one correlation between a MATIP virtual circuit and a TCP session. Unlike the ATP protocol, there is thus no need for correlators within the MATIP protocol. It is also desirable to limit the number of TCP sessions over the network cloud in order to reduce overhead and consumption of resources. The novel ATP protocol significantly reduces the number of TCP sessions needed to transport data over a TCP/IP network. Furthermore, ATP is optimized for interoperation with AX.25 and EMTOX while MATIP is not. An example of such optimization is the ability to pass AX.25 and EMTOX configuration information in an ATP primitive.

The ATP protocol is also distinguishable from the Switch-to-Switch protocol (SSP) of data link switching (DLSw) described in RFC 1795. Specifically, the header fields of the SSP and ATP protocols are different, as are the primitives and different underlying protocol support (SNA for DLSw; ALPS for ATP) for these protocols. Yet, both protocols "tunnel" data frames over TCP/IP and utilize correlators.

The foregoing description has been directed to specific embodiments of this invention. It will be apparent, however, that other variations and modifications may be made to the described embodiments, with the attainment of some or all of their advantages. Therefore, it is the object of the appended claims to cover all such variations and modifications as come within the true spirit and scope of the invention.

What is claimed is:

1. A method for transporting reservation system data over a network transport between intermediate stations bordering a TCP/IP network of a reservation system internetwork, the method comprising the steps of:

establishing airline protocol support (ALPS) tunneling protocol (ATP) virtual circuits over the network transport between the intermediate stations for transporting reservation system data frames;

encapsulating the data frames as ATP-encapsulated frames at one of the intermediate stations; and transporting the ATP-encapsultated frames over the ATP virtual circuits in accordance with ATP protocol software processes executing on the intermediate stations.

2. The method of claim 1 wherein the step of establishing the ATP virtual circuits comprises the step of exchanging a set of primitives between the intermediate stations.

3. The method of claim 2 wherein the step of exchanging the set of primitives further comprises the step of passing configuration information in the form of vectors among the intermediate stations.

4. The method of claim 3 wherein the step of passing configuration information comprises the step of passing agent set control unit (ASCU) multiplexing and encapsulation information by way of a user data vector.

5. The method of claim 4 wherein the step of passing configuration information further comprises the step of passing AX.25 and EMTOX configuration information by way of an AX.25/EMTOX configuration vector that is used by the intermediate stations to correlate ASCU and AX.25/EMTOX resources.

6. The method of claim 5 wherein the step of encapsulating the data frames comprises the step of providing an ATP header to each data frame, the ATP header having a length field whose contents specify a length of the data frame.

7. The method of claim 6 wherein the step of providing an ATP header further comprises the step of providing source and destination correlators within the ATP header, the correlators utilized by the intermediate stations to identify the ATP virtual circuits associated with the ATP-encapsulated frames.

8. The method of claim 7 further comprising the steps of, wherein the intermediate stations are routers and the network transport is a TCP session between the routers, and wherein the AX.25/EMTOX resources are AX.25/EMTOX virtual circuits:

multiplexing the ATP virtual circuits across the TCP session; and using the correlators to associate the multiplexed ATP virtual circuits with appropriate AX.25/EMTOX virtual circuits.

9. The method of claim 2 wherein the step of exchanging the set of primitives comprises the step of exchanging Open_Request and Open_Confirm message primitives among the intermediate stations to activate the ATP virtual circuits.

10. The method of claim 1 wherein the step of encapsulating the data frames comprises the step of providing an ATP header to each data frame, the ATP header having a length field whose contents specify a length of the data frame.

11. The method of claim 10 wherein the step of providing an ATP header further comprises the step of providing source and destination correlators within the ATP header, the correlators used by the intermediate stations to identify the ATP virtual circuits associated with the ATP-encapsulated frames.

12. Apparatus for transporting airline reservation data over a network transport of a TCP/IP network interposed within an airline reservation internetwork system, the internetwork system including a host reservation system (HRS) and a plurality of terminals coupled to an agent set control unit (ASCU), the apparatus comprising:

a branch intermediate station coupled between the ASCU and the TCP/IP network;

a data center intermediate station coupled between the HRS and the TCP/IP network;

an airline protocol support (ALPS) tunneling protocol (ATP) protocol software process executing on each intermediate station;

a plurality of ATP primitive data structures exchanged between the intermediate stations to establish ATP virtual circuits over the network transport to enable transporting of airline reservation data; and ATP frame structures transported over the ATP virtual circuits in accordance with the ATP protocol software processes, the ATP frame structures encapsulating the airline reservation data.

13. The apparatus of claim 12 wherein each ATP frame structure comprises an I-field appended to an ASCU identification header and an ATP header disposed between the ASCU identification header and an arrangement of a TCP header, an IP header and a backbone protocol header.

14. The apparatus of claim 13 wherein the ATP header comprises fields that contain vectors, each having a type, a length and a block of information.

15. The apparatus of claim 14 wherein the ATP header comprises a message type field having contents that specify the type of vectors transported within the frame structure.

16. The apparatus of claim 13 wherein the ATP header comprises a message length field having contents that specify a length of the frame structure including the encapsulated airline reservation data.

17. The apparatus of claim 13 wherein the ATP header comprises destination and source correlator fields having contents that provide handles to correlate virtual circuits within the internetwork system.

18. The apparatus of claim 13 wherein the ATP header comprises a version number field having contents that specify a version of the ATP protocol contained within the frame structure.

19. The apparatus of claim 12 wherein the ATP protocol software process executes within an ATP protocol layer of a modified TCP/IP protocol stack on each intermediate station.

20. The apparatus of claim 12 wherein the branch and data center intermediate stations are one of routers and switches.

\* \* \* \* \*